Dec. 15, 1959     F. A. W. LEFFER     2,917,451
CONVERSION OF HEAVY HYDROCARBONACEOUS MATERIAL
TO LOWER BOILING PRODUCTS
Filed Dec. 31, 1954
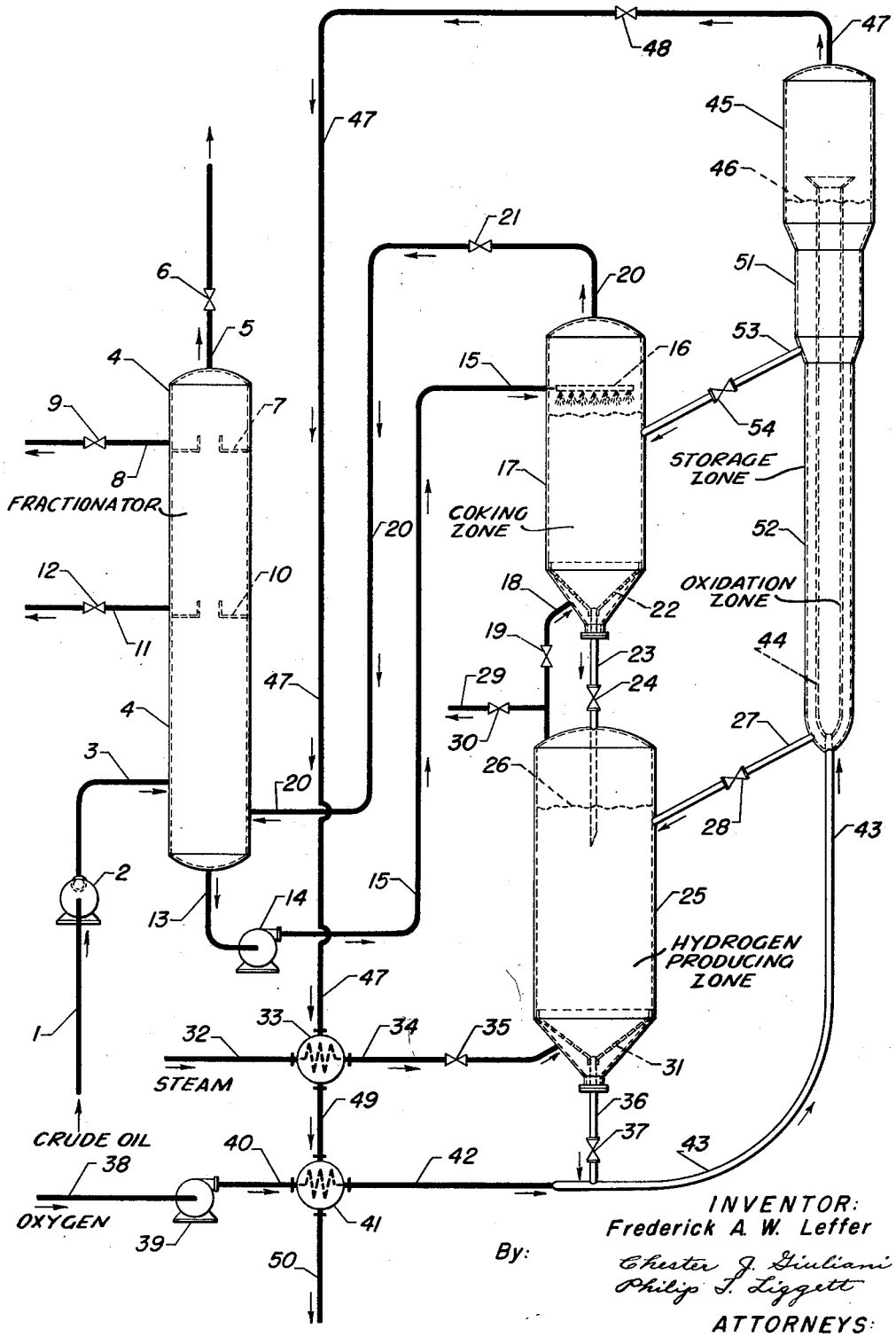
INVENTOR:
Frederick A. W. Leffer
By:
Chester J. Giuliani
Philip J. Liggett
ATTORNEYS United States Patent Office 2,917,451
Patented Dec. 15, 1959

2,917,451

CONVERSION OF HEAVY HYDROCARBONACEOUS MATERIAL TO LOWER BOILING PRODUCTS

Frederick A. W. Leffer, Riverside, Ill., assignor, by mesne assignments, to Universal Oil Products Company, Des Plaines, Ill., a corporation of Delaware Application December 31, 1954, Serial No. 478,970

5 Claims. (Cl. 208—81)

This invention relates to a process for converting heavy hydrocarbonaceous material to lighter products and particularly to a process for treating a crude oil to obtain low boiling liquids and gases with concurrent production of hydrogen which is used at least partially in the conversion of the heavy hydrocarbonaceous material.

It is a main object of this invention to convert a heavy hydrocarbonaceous feed stock such as a crude oil, topped crude or heavier hydrocarbon material into lighter products such as gasoline, gas oil, and gaseous products substantially without concurrent production of a residual carbonaceous fraction.

It is another object of this invention to produce hydrogen by the reduction of water in a hydrogen producing zone concurrently with the conversion of the hydrocarbonaceous feed stock in a hydrocarbon conversion zone and to supply at least a portion of the hydrogen thus produced to said conversion zone to supress therein the formation of highly olefinic volatile products.

It is another object of this invention to effect the above mentioned conversions as well as fractionation of the initial heavy hydrocarbonaceous feed stock and the resultant vaporous products without the necessity of adding extraneous heat by balancing the heat from the exothermic reactions with the heat required for the endothermic reactions of the process. A further object of this invention is the performance of the concurrent hydrocarbon conversion and hydrogen producing reactions substantially in the absence of nitrogen from an extraneous source.

In one embodiment my invention relates to a process for the conversion of heavy hydrocarbonaceous material which comprises passing this material into contact with a bed of particulate solid contact material maintained in a conversion zone at coking temperature in the presence of hydrogen and during this contact converting the heavy hydrocarbonaceous material into lower boiling vaporous products and into coke which commingles with the contact material, withdrawing the vaporous products from the conversion zone, passing the resultant particulate mixture of coke and contact material into a hydrogen producing zone maintained at carbon-steam reaction temperature and therein forming hydrogen gas by reacting a portion of the coke with steam, introducing a stream of the hydrogen gas from the hydrogen producing zone into the conversion zone to furnish said hydrogen therein, passing the residual particles from the hydrogen producing zone into a heating zone and therein burning carbonaceous matter from said residual particles and heating the latter to a temperature above said carbon-steam reaction temperature, separating the gaseous combustion products from the resultant heated particle mass and withdrawing them from the heating zone, introducing a portion of said heated particle mass into the conversion zone at a rate sufficient to maintain the coking temperature therein and supplying the remaining portion of the heated particle mass to the hydrogen producing zone.

In a further embodiment my invention relates to a process for the conversion of a heavy hydrocarbon which comprises passing said heavy hydrocarbon into contact with a fluidized bed of particulate contact material maintained in a conversion zone at coking temperature in the presence of hydrogen whereby said heavy hydrocarbon is converted to lower boiling vaporous products and coke which commingles with and deposits on the contact material, withdrawing said vaporous products from the conversion zone, passing the resultant coke-containing contact material into a hydrogen producing zone and therein commingling it with more highly heated contact material, contacting the commingled contact material in a fluidized bed in the hydrogen producing zone with steam at a temperature at which coke and steam react to produce hydrogen gas, passing at least a portion of the resultant hydrogen gas into the conversion zone as said hydrogen, passing the residual contact material from the lower portion of the hydrogen producing zone into a stream of oxidizing gas to form a suspension of coke-containing material in said oxidizing gas, passing this suspension through a heating zone and therein effecting oxidation of coke with resultant heating of the suspension, discharging the heated suspension into a separating zone and therein separating the same into heated particles and carrying gas, withdrawing said carrying gas from the separating zone and passing the heated particles of contact material into a hot storage zone wherein they are maintained as a descending dense bed in indirect heat exchange with said heating zone, passing a portion of the heated particles from the hot storage zone to the coking zone and passing another portion of the heated particles from the hot storage zone to the hydrogen producing zone as said more highly heated contact material.

In a specific mode of practicing the present invention a crude oil or other hydrocarbon oil containing substantial amounts of components boiling below 700° F. and above 900° F. is introduced into an intermediate portion of a fractionation zone wherein it is contacted with an ascending stream of hot product vapors which vaporize the lower boiling components of the oil charge while at the same time a higher boiling portion of the product vapors is condensed, the higher boiling components of the oil charge and product vapors are withdrawn as a liquid heavy hydrocarbon stream from the lower portion of the fractionation zone and passed into contact with a fluidized bed of particulate contact material maintained in the conversion zone at coking temperature in the presence of hydrogen so that the heavy hydrocarbon stream is converted to lower boiling product vapors and coke which commingles with and deposits on the contact material, the product vapors are supplied from the conversion zone to the fractionation zone, the resultant coke-containing contact material from the conversion zone and a stream of the highly heated contact material from the hot storage zone are introduced into the upper portion of a fluidized bed of contact material in the hydrogen producing zone, superheated steam is introduced into the lower portion of the fluidized bed in the hydrogen producing zone to act therein as fluidizing medium and at the same time react in part with a portion of the coke present in this fluidized bed with formation of hydrogen gas, a stream of the resultant hydrogen gas is introduced into the lower portion of the fluidized bed in the conversion zone to act therein as fluidizing medium and furnish said hydrogen, the residual contact material is withdrawn from the lower portion of the hydrogen producing zone and suspended in a stream of free oxygen-containing gas, the suspension thus obtained is passed upwardly through a verticaly elongated heating zone wherein coke present in the suspension is oxidized and thereby the suspension is heated, the heated suspension is discharged into an elevated separating zone wherein it is separated into highly heated particles and carrying gas, this carrying gas is withdrawn from the separating zone, the heated particles of contact material are passed substantially by gravitational flow into a hot storage zone wherein they are maintained as a descending dense bed in indirect heat exchange with the vertically elongated heating zone, a stream of the particles is passed from the hot storage zone into the fluidized bed in the coking zone at a rate sufficient to maintain therein the coking temperature while the remaining portion of the heated particles from the hot storage zone forms the stream of highly heated contact material which is supplied to the hydrogen producing zone to furnish heat for the coke-steam reaction therein, and carbonaceous matter is removed from the contact material during the reaction in the hydrogen producing zone and during the oxidation in the heating zone in a total amount which substantially corresponds to the amount of coke which is commingled with and deposited on the contact material by the coking reaction in the conversion zone.

The present invention has many advantages over processes heretofore used for the conversion of heavy hydrocarbonaceous material. One advantage is that the present process converts the entire charge stock into lighter material whereby substantially no residuum fraction remains to be disposed of. What would normally be a residuum fraction is converted into lower boiling material and coke, the coke being a highly carbonaceous solid which commingles with or deposits on the particles of contact material during the conversion. The invention contemplates the avoidance of a net production of coke and therefore provides for removal of the coke from the contact material within the process. By burning a portion of the coke from the contact material, heat is generated which is to a considerable extent imparted to the circulating contact material so that the latter will furnish the heat necessary for effecting the hydrocarbon conversion and coking reactions as well as the hydrogen producing reactions. Since the lower boiling material formed in the coking zone is withdrawn from the coking zone as a high temperature gasiform stream which is preferably charged to the lower portion of the fractionation zone and into contact therein with heavy hydrocarbon charge, the heat produced by the burning of the coke indirectly supplies in a preferred embodiment also the heat requirement for the fractionation and for the preheating of the charge before the latter is supplied to the coking zone. Particularly in the treatment of highly carbonaceous crude and residual oils by the present process sufficient heat is imparted to the combution gases generated in the heating zone to permit producing superheated steam for the hydrogen producing reaction and preheating the air or other oxidizing gas to be supplied to the heating zone by utilization of the sensible heat content of said combustion gases.

The contact material referred to in the foregoing embodiments is preferably a particulate solid material having high adsorptive qualities and which may or may not be catalytic in nature. The contact material may include such commonly used materials as coke particles, silica, alumina, zirconia, magnesia, combinations of these such as silica-alumina, silica-magnesia, etc. The materials may be synthetically prepared or may be naturally occurring materials such as pumice, clays, kieselguhr, diatomaceous earth, bauxite, and the like. When it is desired to use a contact material having catalytic properties the material will generally comprise silica-alumina, silica-magnesia or other catalytically active combinations of inorganic oxides and when it is desired that hydrogenation activity be imparted to the catalyst other material may be added such as small quantities of metals having hydrogenating activity including nickel, cobalt, iron, molybdenum, vanadium, chromium, platinum, palladium, etc., compounds of these such as their oxides or sulfides or any combinations thereof. Since no net coke make need be realized, a heterogeneous contact material comprising a refractory oxide base stable at the high temperatures herein contemplated may be used however it may be convenient and at times preferable to use a contact material consisting of coke. When employing particularly high temperatures in the heating zone or in both the heating zone and the hydrogen producing zone, refractory contact material of the type of corundum, silicon carbide and zirconia-containing composites is preferred. The temperatures prevailing in the oxidation or heating zone and in the hydrogen producing zone of the present process and the rather severe treatment the contact material receives from steam in the hydrogen producing zone may substantially diminish any catalytic activity initially possessed by the contact material and the present process will in such case function substantially non-catalytically.

The reactions in the conversion or coking zone and preferably also in the hydrogen producing zone are effected in a fluidized bed which may be described as a bed of solid particles maintained in a state of hindered settling by a gas stream passing upwardly therethrough. The term fluidized bed is used in its ordinary sense and is considered well enough known in the art to require no further description. Because of the advantages of the fluidized bed such as even temperature distribution, elimination of channeling effects, etc., it is the preferred method of contacting the solid particles in the above mentioned zones, however, a descending dense or compact bed may be employed when so desired especially in the hydrogen producing zone. A descending dense or compact bed is utilized in the preferred embodiment of the present invention in the hot storage zone wherein the particles from the heating zone are maintained prior to being passed in separate streams to the coking zone and the hydrogen producing zone. The dense bed in the hot storage zone has no gas phase passing therethrough except for such slight amount of aerating or stripping gas as may be desired to preclude undue compacting and to remove oxygen from the surface of the contact material. When a descending dense bed is used in the hydrogen producing zone it may be used in conjunction with either a concurrent descending or, preferably, a countercurrently ascending fluid stream passing therethrough.

The heating or oxidation zone in the preferred embodiment of the present invention comprises a substantially vertical elongated passageway or conduit through which the oxygen-containing gas and the coke-containing particles to be oxidized pass upwardly as a fluid stream or suspension. The suspension in the oxidation zone is characterized by being a dilute phase suspension of contact material in a concurrently moving stream of carrying gas containing free oxygen. The reaction effected in this zone comprises simple combustion or oxidation of reaction coke, namely substantially that portion of the coke-like by-product of the hydrocarbon conversion reaction which is still associated with the contact material as the latter enters the oxidation zone. The combustion results in the heating of the particulate contact material. The temperature of the carrying gas is similarly raised, and the composition of the carrying gas changes as it passes through the oxidation zone; it becomes increasingly poorer in oxygen and increasingly richer in oxides of carbon and ultimately is discharged from the oxidation or heating zone as a high temperature gas containing very little oxygen, generally in the range of 2% or less, and substantial quantities of carbon oxides; it also contains an appreciable amount of nitrogen when air is used as the free oxygen-containing gas. It is not essential, however, that the reaction coke supplied to the heating zone be burned completely therein and satisfactory heating of the contact material is usually obtained by a combustion which leaves a small residue of reaction coke on the contact material being discharged from the oxidation zone.

The heated particles, upon their separation from the carrying gas are preferably passed into a hot storage zone which comprises an annular space confined by a tubular wall concentric with the oxidation zone and of greater diameter. Thus a heater reservoir is provided for the particle supply for the coking and hydrogen producing zones and at the same time the heating zone as well as the particle supply are maintained at maximum and uniform temperature by the heat exchange through the walls of the elongated oxidation zone. The passage of the particles through the hot storage zone and therefrom to the conversion and hydrogen producing zones is advantageously effected by the gravitational head of solid material maintained in the hot storage zone. Since it is desirable to maintain substantial head, or at least to be capable of obtaining substantial head of particles when desired, it is preferred that the hot particles issuing from the oxidation zone are discharged into a separating zone which is at an elevation substantially above the elevation of both the coking zone and the hydrogen producing zone. By having an elongated hot storage zone, modifications in the amount of head may be made by simply raising or lowering the level of material maintained therein.

In the conversion or coking zone many reactions are effected including thermal cracking, catalytic cracking in some cases, hydrogenation, polymerization, isomerization and others. The contact material in the coking zone is maintained in a turbulent fluidized state by passing hydrogen-containing gas from the hydrogen producing zone into the lower portion of the coking zone so that it rises therethrough keeping the bed of contact material turbulent and eventually discharging from the upper portion of the coking zone with the vaporous conversion products obtained from the hydrocarbonaceous feed stock.

The hydrocarbonaceous feed stock treated in the present process is a hydrocarbon oil or other hydrocarbonaceous material which contains a substantial amount of hydrocarbon components boiling above 900° F. at atmospheric pressure. This feed stock is preferably introduced through suitable distributing means onto the turbulent bed or into the upper portion of this bed in the conversion zone so that its first contact is with the particulate contact material maintained therein rather than with the walls of the conversion chamber. It is advisable to maintain the feed stock at below coking temperature and preferably at less than about 800° F. until it comes into contact with the hot contact material. During contact with the hot solid contact material the hydrocarbonaceous charge is heated and converted into lower boiling vaporous materials such as gasoline, naphtha, kerosene, gas oil, and the like distillates, and into a residual portion which becomes increasingly carbonaceous, eventually passing through a plastic or semi-solid into a solid, coke-like state, the reaction coke thus formed being adsorbed or deposited on the contact material or commingled therewith. The hydrogen present in the coking zone apparently reduces the unsaturation of highly olefinic volatile products resulting from the coking-cracking reactions or at least counteracts by its mass action the formation of highly olefinic distillates to a far greater extent than would result from the equilibrium amount of hydrogen produced by simple cracking. It is preferred to maintain a superatmospheric pressure in the coking zone in order to shift the equilibrium in favor of saturation. When the contact material contains a hydrogenation promoting component such as for example nickel, cobalt, or molybdenum, the hydrogenation reactions may be effected more rapidly at the prevailing conditions and a more saturated product will be obtained. The conditions of temperature and pressure maintained in the conversion or coking zone will depend upon the type of equipment used and to the greater extent upon the characteristics of the charge stock. Generally, the coking zone will be maintained at a temperature of from about 850° F. to about 1500° F. and preferably from about 900° F. to about 1100° F. The temperature of the coking zone will be regulated by the temperatures of the contact material and the hydrogen gas entering the zone, the temperature of the hydrocarbonaceous charge which, however, should be kept below coking temperature, and the relative proportions of each. The entire heat requirements of the conversion and coking zone are furnished in the preferred embodiment of the present process by the streams of heated contact material and hot hydrogen gas introduced into this zone.

The hot contact material issuing from the coking zone is laden with coke and passes to a hydrogen producing zone wherein it is commingled with additional contact material of higher temperature from the hot storage zone whereby the temperature of the entire bed is raised and the bed is contacted, preferably in a fluidized condition, with steam. The presence of steam and hot carbon causes the well known water gas reactions to be effected to produce hydrogen and oxides of carbon and the hydrogen thus produced is passed at least in part from the upper portion of the hydrogen producing zone to the lower portion of the coking zone to provide the hydrogen atmosphere maintained in the latter zone.

The hydrogen producing zone is maintained at a temperature in excess of 1200° F. so that the reaction rate and equilibrium are suitable for the production of hydrogen. It is desirable to maintain the water gas producing zone at a fairly high temperature so that the product withdrawn therefrom is suitably rich in hydrogen. The ultimate temperature maintained in the hydrogen producing zone will depend largely upon the economics of constructing a zone to withstand high temperatures. Preferably the hydrogen producing reactions are effected at temperatures of from about 1500° F. to about 2000° F. It is particularly advantageous in the process of the present invention that the incoming gaseous reactant stream contacts the hot particles as they are being discharged from the hydrogen producing zone thereby taking full advantage of the heat of the contact material by substantially countercurrent contact. It may be desirable to provide a means of reducing the temperature of the gaseous products from the hydrogen producing zone to a level not lower than the temperature of the conversion zone and preferably to a temperature somewhat above the latter so that the favorable equilibrium established at optimum temperature in the hydrogen producing zone may be "frozen."

It is also advantageous to limit the composition of the gasiform reactant supplied to the hydrogen producing zone to substantially exclude nitrogen therefrom. Nitrogen is an undesirable diluent in the hydrogen producing reaction, it diminishes the saturating effect of the hydrogen gas in the conversion and coking zone, and it tends to impair the quality of the final volatile hydrocarbon products of the process. Accordingly, the present process provides for introducing to the hydrogen producing zone a gaseous reactant which consists entirely or at least largely of steam, preferably in superheated state, and which may contain carbon oxides but in any event is practically free from nitrogen.

Hydrogen producing reactions are not simple and may require particular conditions to be maintained in that zone in order to procure the most desirable products. The various reactions between $H_2O$ and carbon produce principally hydrogen, carbon dioxide and carbon monoxide, with formation of minor amounts of methane and possibly heavier hydrocarbons. Each of the reactions operates independently with regard to the equilibrium established at each temperature, however, the reactions are inter-related in that variations of the equilibrium between products and reactants in one reaction will change the concentrations of reactants and products of the other reactions. For example, as the temperature of the reaction zone increases from a low temperature to a moderate temperature the equilibrium for the formation of methane becomes less favorable thereby increasing the amount of hydrogen in the reaction product. As the temperature increases to the moderate temperature range, that is about 1500° F., the equilibrium for carbon dioxide formation is favorable and the hydrogen production rate is high due to the fact that methane formation is inhibited and carbon monoxide formation is also inhibited so that a maximum of hydrogen is realized from each molecule of carbon. As the temperature increases from the moderate temperature range to the high temperature range, that is in the range of 2000° F., the equilibrium favors the formation of carbon monoxide thereby at least partially diminishing the hydrogen production by causing the formation of less carbon dioxide, however, at these high temperatures there will be virtually no methane present thereby increasing the hydrogen production. It may be seen that the law of mass action will operate when one reaction or the other changes the concentrations of reactants and also when various operating conditions such as pressure, space velocity, etc. are varied due to various reactions that produce volume increases or decreases at different rates and reactions that proceed at different rates.

The particulate material passing from the lower portion of the hydrogen producing zone enters a stream of oxygen-containing gas and is oxidized as a suspension in the hereinbefore described manner, ultimately discharging into the separation zone maintained superadjacent the hot storage zone. During the oxidation the solid particles are heated to a temperature which is always substantially higher than the average temperature maintained in the hydrogen producing zone and which may range upwardly from 1550° F. to about 2200° F. or higher. The material in the hot storage zone which is maintained at an elevated temperature as hereinbefore described passes in separate, controlled streams partially to the coking zone and partially to the hydrogen producing zone.

The hot product vapors withdrawn from the upper portion of the coking zone pass into an intermediate portion of the fractionation zone at a point below the introduction of the heavy hydrocarbon oil thereto. The heavy hydrocarbon oil is preferably charged at ambient temperature and the heat required for fractionation is obtained from the hot product vapors. Resultant gasoline and heavier distillate fractions are fractionated from the heavy hydrocarbon oil and the vaporous conversion products and pass to withdrawal points in the upper portion of the fractionation zone. The heavy residual portions of the heavy oil charge descend to the bottom of the fractionation zone concurrently with the recycle stock condensed from the conversion vapors. It may be seen that the material insufficiently converted in an initial passage through the coking zone is recirculated automatically by passing the charge stream to the coking zone along with the fresh charge. The gaseous products from the fractionation zone pass overhead while the heavier distillate products such as gasoline, kerosene, gas oil, etc. are taken off as side cuts by conventional means. It is to be understood that the hydrocarbonaceous charge of the process may also be supplied, all or in part, directly to the conversion zone, with none or only a portion thereof passing first through the fractionation zone, and in such case the fractionation may be aided by indirect cooling, while the heaviest fraction dephlegmated from the product vapors is returned to the conversion zone. The fractionation zone may be of any suitable conventional construction and may comprise a cylindrical column containing sieve decks, bubble trays, packing or other conventional means for obtaining intimate contact between liquid and vapor streams.

As hereinbefore described the temperature maintained in the various zones may be controlled by regulating the temperature and proportion of each of the feed streams to the zones. This means of controlling temperature is merely a distribution of the heat present in the process to various points in the process, however, the process of the present invention also affords a method of controlling the amount of heat present in the process as well as its distribution. Since the process provides for the exhaustive conversion of the charge into lower boiling products it is necessary that all of the coke produced in the conversion or coking zone is removed from the contact material within the process at equilibrium operating conditions. When for example a new charge stock is used which produces greater quantities of coke than the one previously used the carbon removing burden on the system is increased. With an increasing amount of coke to be removed, it would be necessary in conventional catalytic cracking units to effect additional burning in the catalyst regeneration zone which would produce a hotter catalyst which in turn produces more coke upon coming into contact with the feed stock. It may be seen that the undesirable condition of coke formation in conventional cracking units becomes increasingly undesirable because the increased coke laydown causes still greater increases in coke laydown. In the process of the present invention this shortcoming of conventional cracking systems is overcome by the simultaneous use of two means for disposing of coke, one of which is endothermic and one of which is exothermic. Therefore, when an increased quantity of coke is produced in the conversion zone it may be disposed of by increasing the oxidation in the heating zone exothermically to produce high temperature contact particles or it may be disposed of by being contacted with increased quantities of steam to produce greater quantities of hydrogen endothermically. A general lowering of the heat content of a system in accordance with the present invention may be effected, when a greater quantity of coke is laid down, if one selects the endothermic method of disposing of additional coke. The preferred method of disposing of additional coke in the present process is to increase both oxidation and hydrogen production so that the temperature in any portion of the plant is maintained at the desired level. This means of control is of particular advantage since the products from both control means, that is flue gas and hydrogen are not undesirable in large volumes and in fact, in the case of hydrogen, are highly desirable in large quantities. The excess hydrogen gas produced may be purified or may be used as produced in other refinery operations such as for example in the hydrogenation of hydrocarbons to remove impurities therefrom.

The process of the present invention may be further described with reference to the accompanying drawing which diagrammatically illustrates one embodiment of the present invention and which is presented to exemplify the invention rather than to limit the same to the particular embodiment shown.

The drawing illustrates the processing of a crude oil to obtain only light material.

Referring now to the drawing a crude oil is charged from line 1 by means of pump 2 through line 3 into an intermediate portion of fractionator 4. In fractionator 4 the crude oil stream descends and is countercurrently contacted by an ascending hot product gas stream entering fractionator 4 through line 20 at a point lower in elevation than the point at which the crude enters the fractionator. As a result of the countercurrent contact of the hot gas stream and the crude oil stream, the lower boiling material contained in the crude oil is vaporized and rises through the column along with the hot vapor stream which in turn is partially condensed so that the higher boiling material contained therein rescends the column with the higher boiling material from the crude. Side cuts are removed from the column by conventional means such as trays 10 and 7 which discharge gas oil or the like from an intermediate point in the column through line 11 and valve 12, and lighter distillate, for example gasoline, from tray 7 through line 8 and valve 9. The normally gaseous material is discharged through line 5 and valve 6 and may be passed to storage or further processing, or it may be used as fuel gas.

The heavy, high boiling portions of the hot vapor stream and of the crude accumulate in the lower portion of fractionator 4 and are discharged through line 13 and pump 14 into line 15 which passes the heavy liquid hydrocarbon stream at practically the same temperature as prevailing in the lower portion of the fractionator, namely below about 800° F., into the upper portion of coking zone 17 wherein it is distributed through distributing device 16 as finely subdivided droplets onto the fluidized bed maintained in coking zone 17. As hereinbefore described the heavy oil upon contacting the hot contact material which is maintained at a temperature in excess of 850° F., is converted to coke and lower boiling vaporous hydrocarbon material, the latter passing from the coking zone along with the hydrogen-containing gas contained therein through line 20 and valve 21 into fractionator 4.

The hydrogen is introduced into the conversion and coking zone through line 18 and valve 19 and passes from beneath distributing grid 22 maintained in the lower portion of zone 17 upwardly through this zone wherein it maintains the particles of solid contact material in a turbulent or fluidized state. The hydrogen in the gas also provides for at least partial saturation of the olefinic material produced by the cracking reactions effected in coking zone 17.

The solid particles which are laden with coke descend to the lower portion of coking zone 17 and pass therefrom through conduit 23 and valve 24 to be discharged below the surface of a fluidized bed of contact material 26 maintained in hydrogen producing zone 25. The solid contact material from line 23 is commingled with additional solid contact material which is at a higher temperature and which enters hydrogen producing zone 25 in an intermediate portion thereof through line 27 and valve 28. The commingled particles are maintained in a fluidized bed by the upward passage of steam which enters the lower portion of hydrogen producing zone 25 through line 34 and valve 35 and is distributed through grid 31 to promote uniform passage through the fluidized bed 26. The contact of steam and coke at a temperature in excess of 1200° F. which is maintained in the hydrogen producing zone, causes reactions between the carbon of the coke and the steam to produce carbon oxides and hydrogen. The resulting hydrogen-containing gas passes from the upper portion of hydrogen producing zone 25 through line 18 and valve 19 into the lower portion of coking zone 17. Such hydrogen gas as is in exess of the amount desired in the conversion zone 17, is withdrawn from the system through line 29 and valve 30.

The particles descend in the fluidized bed 26 and are ultimately withdrawn from the lower portion of hydrogen producing zone 25 through line 36 and valve 37 and are entrained in an oxygen-containing gas stream in line 43. The suspension obtained by commingling the streams of solid contact material and oxygen-containing gas passes through line 43 into and upwardly through oxidation zone 44 wherein the coke on the contact material is oxidized to produce carbon oxides with a resultant temperature rise in the suspension to above 1550° F., and under preferred operating conditions to within the range of 1950°–2200° F. The suspension of heated solid particles and gas is discharged into the elevated separation zone 45 wherein lateral expansion and flow velocity reduction causes the particles to precipitate from the gas and become a part of bed 46 in chamber 51 having particle storage zone 52 which supplies hot contact material to coking zone 17 through line 53 and valve 54 and to hydrogen producing zone 25 through line 27 and valve 28. The hot gas discharges from the upper portion of separation zone 45 through line 47 and valve 48 whereafter it may be withdrawn all or in part, from the process. In a preferred embodiment, however, this highly heated gas is passed through line 47 into heat exchanger 33, wherein steam supplied through line 32 is superheated. The resultant superheated steam is supplied through line 34 into the lower portion of hydrogen producing zone 25. A dust precipitator (not shown in the drawing) may be arranged in line 47 to eliminate the rather small amount of extremely fine solid particles which may be entrained in the hot gas and which may originate from metal-containing impurities in the hydrocarbon charge and/or from abrasion of the circulating contact material. Additional heat may be removed from the flue gas stream by passing the flue gas issuing from heat exchanger 33 through line 49 into heat exchanger 41 which preheats air passing through line 38, pump 39 and line 40 into heat exchanger 41. The preheated air from heat exchanger 41 is passed through line 42 into the before-mentioned line 43.

The temperature at which the reaction in the oxidation zone is effected, that is a temperature above 1550° F. and preferably in the range of from about 1950° F. to about 2200° F., may be controlled by regulating the quantity of oxygen in the oxygen-containing gas, by regulating the temperature of the oxygen-containing gas and by regulating the amount of coke to be burned. The amount of oxygen in the oxygen-containing gas may be regulated by blending inert gaseous material, such as steam, nitrogen, or flue gas, with the air or oxygen used. A portion of the flue gas obtained within the process, either in heated state from line 48 or in cooled state from line 50, depending also on the temperature effect desired, is particularly suitable for this purpose although connecting lines for such blending are not shown in the drawing. The temperature at which the oxygen-containing gas enters the process may be controlled by any conventional means and in the embodiment illustrated, by the amount of heat exchange between the entering oxygen-containing gas and the flue gas which is discharged from the oxidation zone. The amount of carbon or coke to be burned from the contact material may be regulated by the intensity of the coking reaction effected in the coking zone and by the amount of reaction effected in the hydrogen producing zone. Thus, as hereinbefore described, when a given conversion is effected in the coking zone the amount of carbon to be burned from the contact material in the oxidation zone may be diminished by increasing the amount of hydrogen producing reaction to any desired extent up to a maximum at which the endothermic heat requirements of the process can still be furnished by carbon combustion in the heating zone.

The reactions in the conversion and coking zone 17 may be effected at substantially atmospheric pressure or such higher pressure as is required to force the vaporous reaction products into the fractionation zone 4 and permit discharge of the distillate product and gas fractions therefrom into receivers maintained at substantially atmospheric pressure. It is preferred, however, to maintain zone 17 at a more elevated pressure such as from 50 to 250 pounds per square inch or higher in order to enhance the saturating effect of the hydrogen on the volatile conversion products in the conversion zone. The hydrogen producing zone 25, oxidation or heating zone 44, separator 45, and hot storage zone 52 are operated at pressures which are in such balance with the pressure in zone 17 that continuous circulation of the solid particulated material through these zones is maintained.

It is, of course, understood that many other heat exchange relationships may be maintained between the various process streams of the system without departing from the scope of this invention. Also other obvious modifications may be made such as the placement of instrumentation, valves, pumps, coolers, etc. which are convenient or economical for the operation of the system, and the use of small amounts of superheated steam for aeration in lines 23, 27, 36 and 53. The process of the present invention may also be used in conjunction with other processing systems such as gas concentration and polymerization units to utilize the normally gaseous hydrocarbons produced in the conversion zone, catalytic or thermal reforming units to improve the quality of the gasoline, naphtha, kerosene or similar light distillate fractions recovered in the present process. When a gas oil fraction is produced it may be desirable to use a catalytic cracker in conjunction with the present process in order to utilize this fraction.

It may be seen that the process of the present invention affords a method of treating crude and heavier oils and bitumens to produce therefrom light products the volatility or component distribution of which can be varied within wide limits without creating non-volatile residual product that would have to be disposed of and without requiring supply of heat from external source. The process permits to adjust the relative proportion of light to heavy product fractions, such as for example gasoline to distillate fuel oil, according to seasonal market demands simply by adjustment of operating conditions, heavy distillate product fractions being recycled to the conversion zone when it is desired to produce solely products of lower boiling characteristics. It also will be evident to those skilled in the art that the conditions of operation may be modified in the present process to produce substantial amounts of normally gaseous hydrocarbons of two or more carbon atoms along with gasoline hydrocarbons of high aromaticity or octane value without departing from the scope of the invention.

I claim as my invention:

1. A process for the conversion of a heavy hydrocarbon which comprises passing said heavy hydrocarbon into contact with a fluidized bed of particulate contact material maintained in a conversion zone at coking temperature in the presence of hydrogen whereby said heavy hydrocarbon is converted to lower boiling vaporous products and coke which commingles with and deposits on said contact material, withdrawing said vaporous products from said conversion zone, passing the resultant coke-containing contact material into a hydrogen producing zone and therein commingling it with more highly heated contact material, contacting the commingled contact material with steam in a fluidized bed in said hydrogen producing zone at a temperature at which coke and steam react to produce hydrogen gas, passing at least a portion of the resultant hydrogen gas into said conversion zone as said hydrogen, passing the residual contact material from the lower portion of said hydrogen producing zone into a stream of oxidizing gas to form a suspension of coke-containing material in said oxidizing gas, passing said suspension through a heating zone and therein effecting oxidation of coke with resultant heating of the suspension, discharging the heated suspension into a separating zone and therein separating the same into heated particles and carrying gas, withdrawing said carrying gas from said separating zone and passing the heated particles of contact material into a hot storage zone wherein they are maintained as a descending dense bed in indirect heat exchange with said heating zone, passing a portion of said heated particles from said hot storage zone to said coking zone and passing another portion of said heated particles from said hot storage zone to said hydrogen producing zone as said more highly heated contact material.

2. The process of claim 1 further characterized in that said conversion zone is maintained at a coking temperature of from about 850° F. to about 1500° F. by supplying hydrogen gas thereto substantially at the temperature of its discharge from said hydrogen producing zone and by introducing heated particles from said hot storage zone into said conversion zone at such a rate that thereby the remaining portion of the required heat is furnished.

3. The process of claim 1 further characterized in that said hydrogen producing zone is maintained at a carbon-steam reaction temperature of from about 1500° F. to about 2000° F. and that the steam being introduced into said hydrogen producing zone is superheated to approximately said carbon-steam reaction temperature by indirect heat exchange with heated carrying gas withdrawn from said separating zone.

4. The process of claim 1 further characterized in that carbonaceous matter is removed from the solid particles in said hydrogen producing zone and in said heating zone at a combined rate substantially equal to the rate at which coke is formed from said heavy hydrocarbon and commingled with and deposited on the contact material in said conversion zone.

5. A process for the conversion of hydrocarbon oil which comprises introducing a hydrocarbon oil containing substantial amounts of components boiling above 900° F. into an intermediate portion of a fractionation zone wherein it is contacted under fractionating conditions with an ascending stream of hot product vapors, withdrawing a liquid heavy hydrocarbon stream containing a high boiling portion of said product vapors in condensed state in admixture with at least a high boiling portion of said hydrocarbon oil from the lower portion of said fractionation zone and passing the same into contact with a fluidized bed of particulate contact material maintained in a conversion zone at coking temperature, converting said heavy hydrocarbon stream in the presence of hydrogen in said fluidized bed into lower boiling product vapors and into coke which commingles with and deposits on said contact material, passing said lower boiling product vapors from said conversion zone to said fractionation zone, introducing the resultant coke-containing contact material from said conversion zone and a stream of more highly heated contact material from a hot storage zone into the upper portion of a fluidized bed of contact material in a hydrogen producing zone, introducing superheated steam into the lower portion of the fluidized bed in said hydrogen producing zone to act therein as fluidizing medium and react in part with a portion of the coke present in the fluidized bed with formation of hydrogen gas, introducing a stream of the resultant hydrogen gas into the lower portion of the fluidized bed in said conversion zone to act therein as fluidizing medium and furnish said hydrogen, withdrawing the residual contact material from the lower portion of said hydrogen producing zone and suspending the same in a stream of free oxygen-containing gas, passing the resultant suspension upwardly through a vertically elongated heating zone wherein coke present in said suspension is oxidized and the suspension is heated to a temperature substantially above that prevailing in said hydrogen producing zone, discharging the heated suspension into an elevated separating zone and therein separating the same into highly heated particles and carrying gas, withdrawing said carrying gas from said separating zone, passing said heated particles of contact material substantially by gravitational flow into said hot storage zone and therein maintaining them as a descending dense bed in indirect heat exchange with said vertically elongated heating zone, passing a stream of said heated particles from said hot storage zone into the fluidized bed in said coking zone at a rate sufficient to maintain therein said coking temperature and passing another stream of said heated particles from said hot storage zone to said hydrogen producing zone as said stream of more highly heated contact material.

References Cited in the file of this patent

UNITED STATES PATENTS

| | | |
|---|---|---|
| 2,284,603 | Belchetz et al. | May 26, 1942 |
| 2,527,575 | Roetheli | Oct. 31, 1950 |
| 2,707,702 | Watson | May 3, 1955 |
| 2,717,862 | Murphree | Sept. 13, 1955 |
| 2,731,396 | Harding et al. | Jan. 17, 1956 |
| 2,738,307 | Beckberger | Mar. 13, 1956 |

FOREIGN PATENTS

| | | |
|---|---|---|
| 714,780 | Great Britain | Sept. 1, 1954 |